US010076814B1

(12) United States Patent
Lee et al.

(10) Patent No.: US 10,076,814 B1
(45) Date of Patent: Sep. 18, 2018

(54) MULTIPLE HEAT SOURCE-TYPE PREHEATING DEVICE FOR MACHINING APPARATUS

(71) Applicant: Changwon National University Industry Academy Cooperation Corps, Changwon-si, Gyeongsangnam-do (KR)

(72) Inventors: Choon-Man Lee, Changwon-si (KR); Wan-sik Woo, Changwon-si (KR); Won-jung Oh, Sacheon-si (KR)

(73) Assignee: Changwon National University Industry Academy Cooperation Corps, Changwon-si (KR)

( * ) Notice: Subject to any disclaimer, the term of this patent is extended or adjusted under 35 U.S.C. 154(b) by 0 days.

(21) Appl. No.: 15/601,732

(22) Filed: May 22, 2017

(30) Foreign Application Priority Data

Mar. 20, 2017 (KR) .................. 10-2017-0034706

(51) Int. Cl.
| | |
|---|---|
| *H05B 6/10* | (2006.01) |
| *H05B 6/12* | (2006.01) |
| *B23P 25/00* | (2006.01) |
| *H05B 6/40* | (2006.01) |
| *B23K 26/10* | (2006.01) |
| *B23K 26/00* | (2014.01) |

(52) U.S. Cl.
CPC ........ *B23P 25/006* (2013.01); *B23K 26/0093* (2013.01); *B23K 26/10* (2013.01); *H05B 6/101* (2013.01); *H05B 6/40* (2013.01)

(58) Field of Classification Search
CPC .... B23K 26/0093; B23K 26/08; B23P 25/006

USPC ......... 219/635, 652, 656, 657, 660, 121.76, 219/121.8, 121.82, 123, 124.21, 1, 24.32; 373/148

See application file for complete search history.

(56) References Cited

U.S. PATENT DOCUMENTS 7,442,625 B2 * 10/2008 Ito .................. H01L 21/324
257/E21.051
2007/0062920 A1  3/2007 Shin

FOREIGN PATENT DOCUMENTS

| DE | 112012006740 T5 | 5/2015 |
|---|---|---|
| EP | 1279462 A2 | 1/2003 |
| EP | 2554322 A2 | 2/2013 |
| JP | 0734999 B2 | 4/1995 |
| JP | 07-148585 A | 6/1995 |

(Continued)

*Primary Examiner* — Quang Van
(74) *Attorney, Agent, or Firm* — Novick, Kim & Lee, PLLC; Jae Youn Kim

(57) ABSTRACT

A multiple heat source-type preheating device for a machining apparatus is provided. The multiple heat source-type preheating device for a machining apparatus includes a first heat source provision module and a second heat source provision module. The first heat source provision module is installed to be moved along a portion of a material to be machined along with a spindle adapted to rotate a tool at high speed, and is configured to preheat the portion of the material to be machined by providing a heat source thereto. The second heat source provision module is installed to be moved along with the first heat source provision module, and is configured to preheat the portion of the material to be machined by providing a heat source thereto while preceding or following the first heat source provision module.

4 Claims, 8 Drawing Sheets

(56) References Cited

FOREIGN PATENT DOCUMENTS

| | | |
|---|---|---|
| JP | 5364132 B2 | 12/2013 |
| KR | 10-1366961 B1 | 3/2014 |
| KR | 10-1367052 B1 | 3/2014 |
| KR | 10-1474708 B1 | 12/2014 |
| KR | 10-1695795 B1 | 1/2017 |
| WO | 2012019971 A1 | 2/2012 |

\* cited by examiner

MULTIPLE HEAT SOURCE-TYPE PREHEATING DEVICE FOR MACHINING APPARATUS

BACKGROUND

1. Technical Field

The present invention relates generally to a preheating device, and more particularly to a novel multiple heat source-type preheating device for a machining apparatus, which is coupled to a spindle configured to rotate a tool at high speed and preheats a portion to be machined by the tool, and which can smoothly preheat the overall range of the portion to be machined by the tool while minimizing the output of a laser module used for the preheating.

2. Description of the Related Art

In general, methods using an external heat source for machining include two methods: ablation designed to directly use a heat source to cut a material; and thermally-assisted machining (TAM) designed to use a heat source for preheating intended to reduce the strength of a material.

TAM of these methods uses a laser, and is applied to the cutting of a difficult-to-cut material. In connection with this, related technologies are disclosed in Korean Patent No. 10-1474708, Korean Patent No. 10-1367052, Korean Patent No. 10-1366961, and Korean Patent No. 10-1695795.

Meanwhile, a laser heat source used in the above-described conventional technologies is advantageous in that a material can be fast heated, but is problematic in that a heated material is rapidly cooled when the supply of the heat source is stopped.

In other words, a portion to be machined, which has been preheated through the supply of the heat source, is cooled to a temperature below an appropriate preheating temperature before machining is performed by a tool. Accordingly, during machining, phenomena occur in which a surface becomes rough and machining quality is degraded.

Therefore, conventionally, in order to overcome the above problems, the output (laser output) of the heat source must be increased. However, in this case, a new problem arises in that it becomes rather difficult to machine a material because the tool may be damaged or the physical properties and state of the material may be changed.

SUMMARY

The present invention has been conceived to overcome various types of problems of the conventional technologies, and an object of the present invention is to provide a novel multiple heat source-type preheating device for a machining apparatus, which can prevent preheating temperature from being rapidly decreased even when the supply of a heat source to a portion to be machined is stopped, and which can smoothly preheat a portion to be machined regardless of the properties of a material, a machining range, and a machining depth.

According to an aspect of the present invention, there is provided a multiple heat source-type preheating device for a machining apparatus, including: a first heat source provision module installed to be moved along a portion of a material to be machined along with a spindle adapted to rotate a tool at high speed, and configured to preheat the portion of the material to be machined by providing a heat source thereto; a second heat source provision module installed to be moved along with the first heat source provision module, and configured to preheat the portion of the material to be machined by providing a heat source thereto while preceding or following the first heat source provision module.

The first heat source provision module may be installed to be rotated around the tool in the state of being spaced apart from the tool; and the second heat source provision module may be installed to be rotated around the first heat source provision module in the state of being spaced apart from the first heat source provision module.

The heat sources provided by the first heat source provision module and the second heat source provision module may have different preheating areas.

The heat sources provided by the first heat source provision module and the second heat source provision module may have different preheating depths.

The preheating sequence of the heat source provided by the first heat source provision module and the heat source provided by the second heat source provision module may be determined based on a machining depth or the thermal conductivity of the material.

At least any one of the first heat source provision module and the second heat source provision module may be a laser module configured to radiate a laser beam as a heat source.

At least any one of the first heat source provision module and the second heat source provision module may be an induction heater configured to preheat the portion of the material to be machined through induction heating by providing an electromagnetically induced current thereto.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

A preferred embodiment of a multiple heat source-type preheating device for a machining apparatus according to the present invention will be described in detail below with reference to FIGS. 1 to 8.

Figure 1:
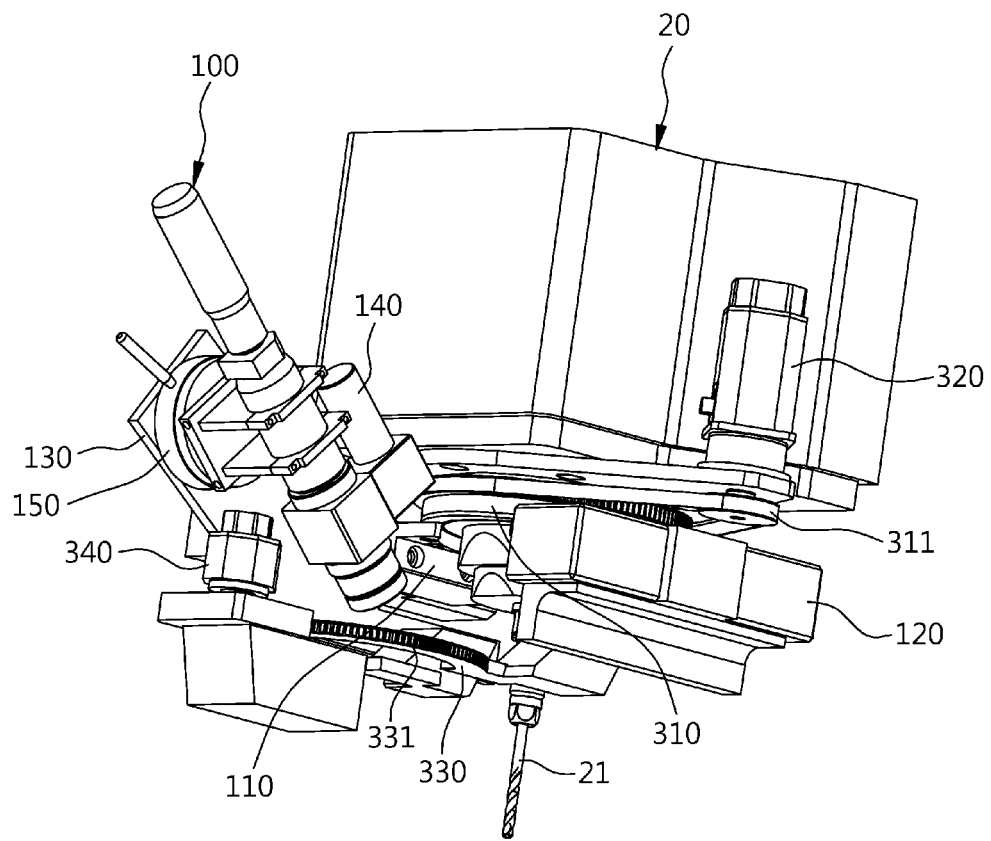
FIG. 1 is a perspective view illustrating a multiple heat source-type preheating device for a machining apparatus according to an embodiment of the present invention.
Figure 2:
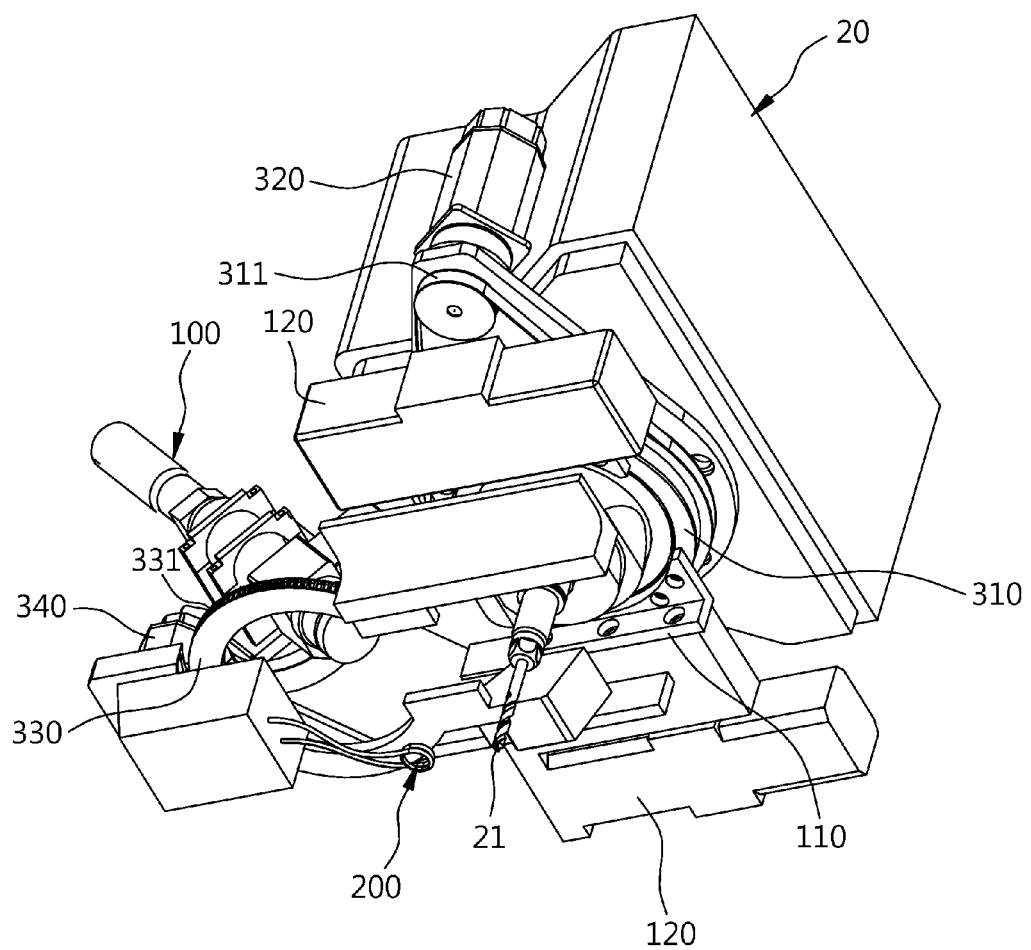
FIG. 2 is a perspective view showing the multiple heat source-type preheating device for a machining apparatus according to the embodiment of the present invention when viewed from below.
Figure 3:
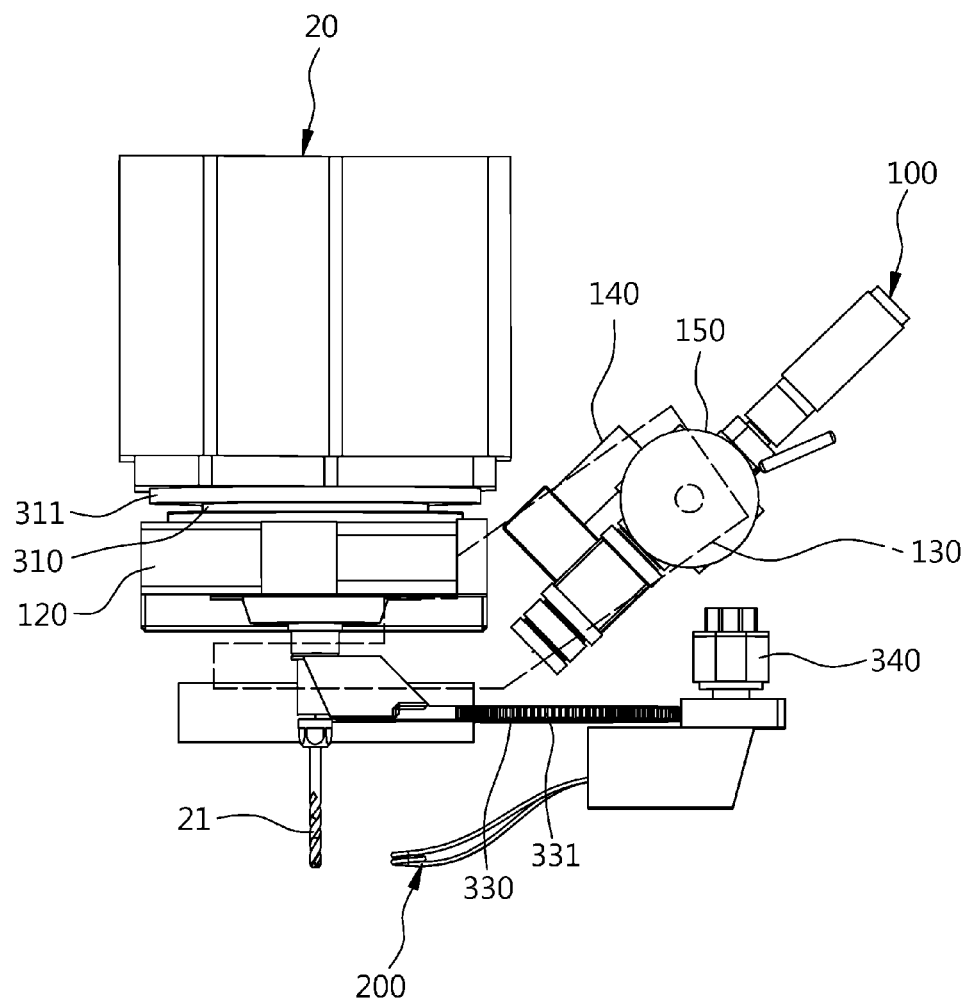
FIG. 3 is a front view illustrating the multiple heat source-type preheating device for a machining apparatus according to the embodiment of the present invention.
Figure 4:
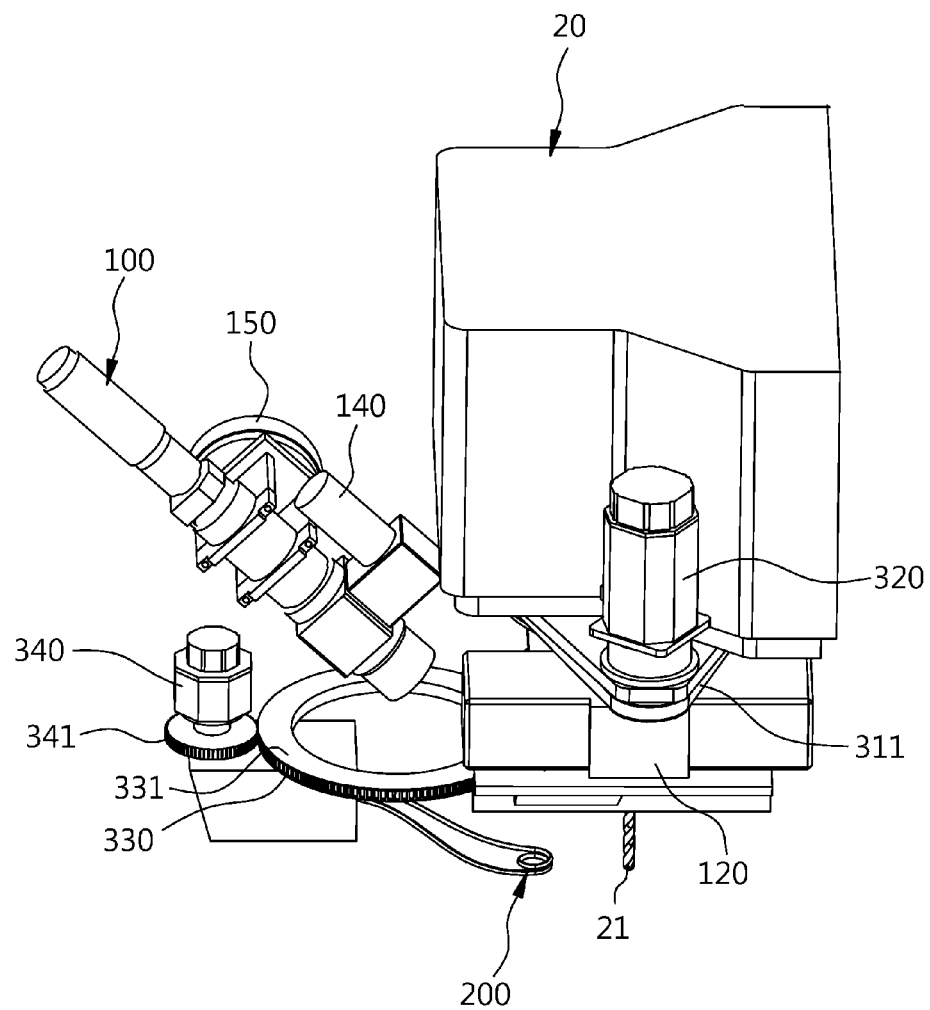
FIG. 4 is a perspective view showing the multiple heat source-type preheating device for a machining apparatus according to the embodiment of the present invention when viewed from above.
Figure 5:
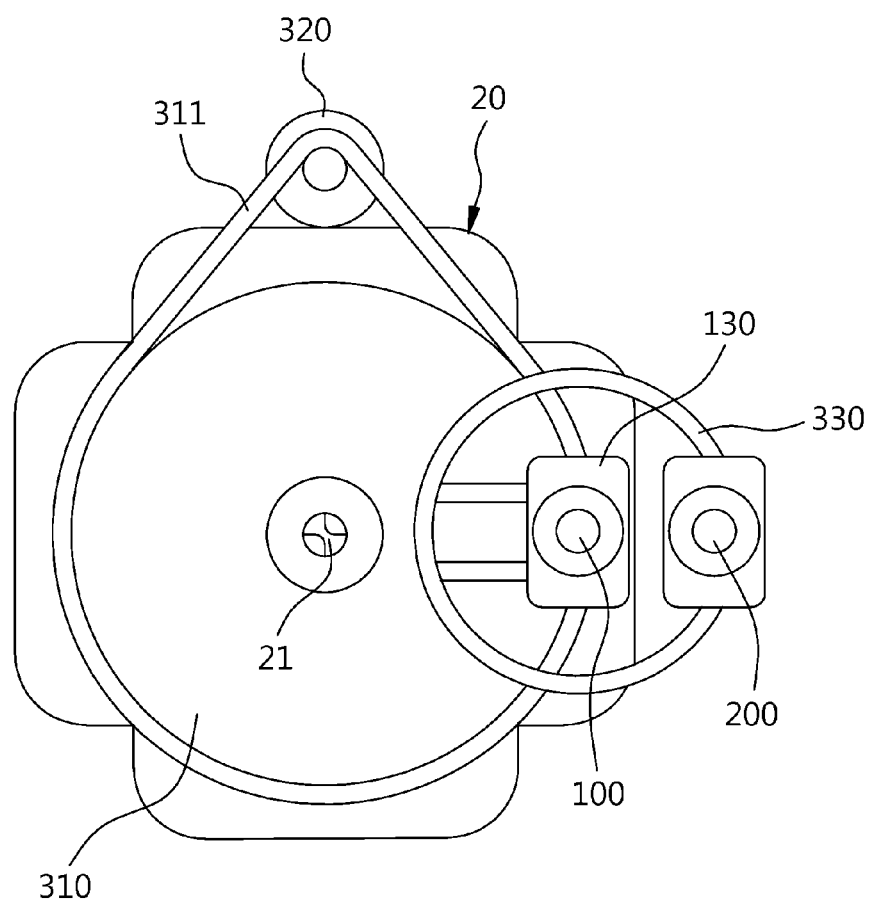
FIG. 5 is a schematic plan view illustrating the relationship in arrangement among the machine tool and two heat source provision modules of the multiple heat source-type preheating device for a machining apparatus according to the embodiment of the present invention.
Figure 6:
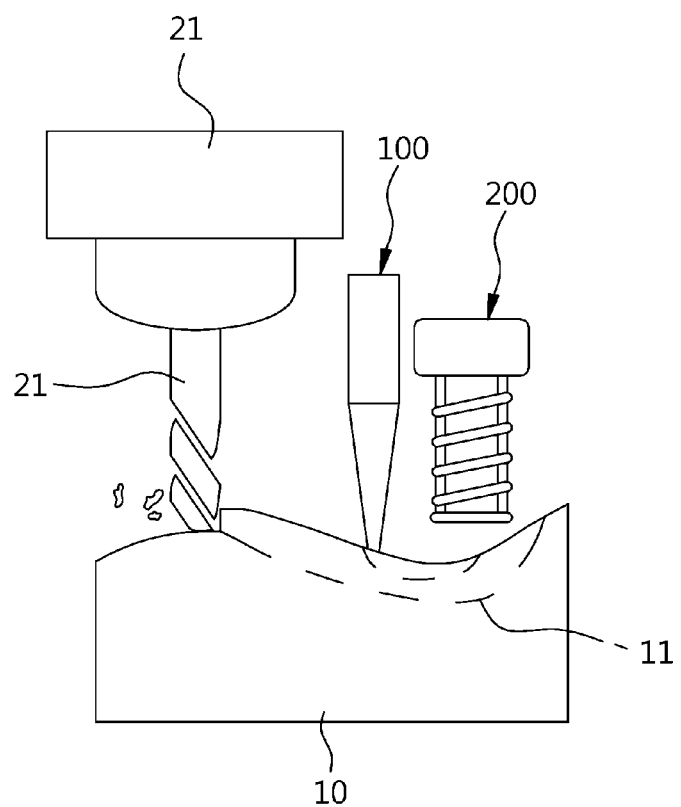
FIG. 6 is a schematic front view illustrating the relationship in arrangement among the machine tool and two heat source provision modules of the multiple heat source-type preheating device for a machining apparatus according to the embodiment of the present invention.
Figure 7:
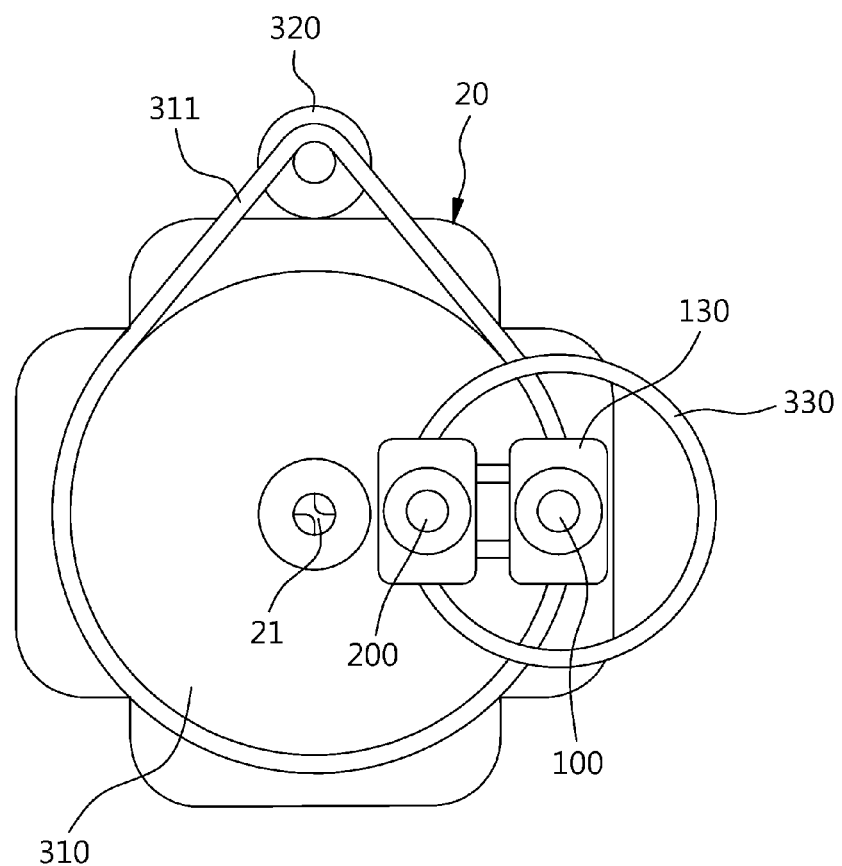
FIG. 7 is a schematic plan view illustrating the operation of the multiple heat source-type preheating device for a machining apparatus according to the embodiment of the present invention.
Figure 8:
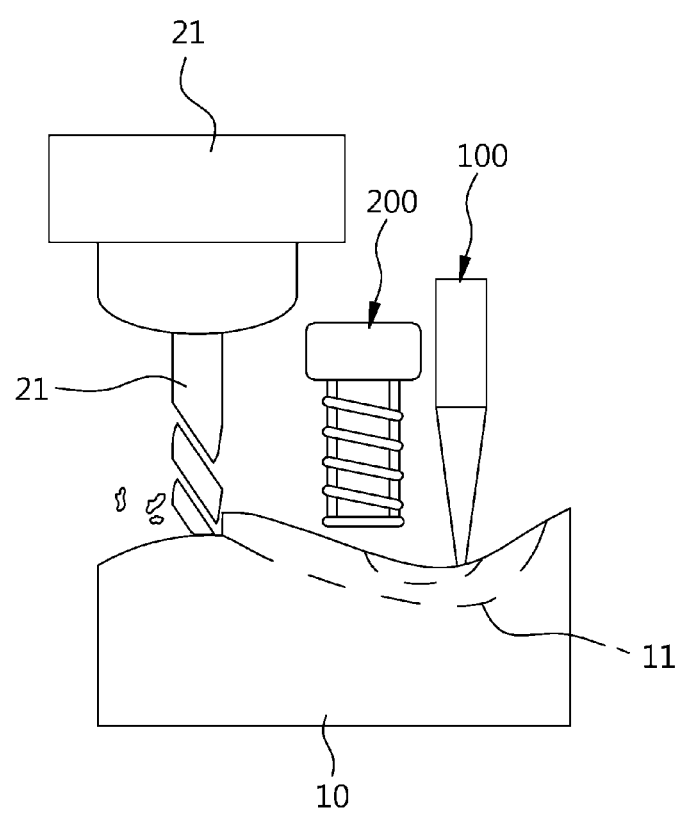
FIG. 8 is a schematic front view illustrating the operation of the multiple heat source-type preheating device for a machining apparatus according to the embodiment of the present invention.

FIG. 1 is a perspective view illustrating a multiple heat source-type preheating device for a machining apparatus according to an embodiment of the present invention, FIG. 2 is a perspective view showing the multiple heat source-type preheating device for a machining apparatus according to the embodiment of the present invention when viewed from below, FIG. 3 is a front view illustrating the multiple heat source-type preheating device for a machining apparatus according to the embodiment of the present invention, and FIG. 4 is a perspective view showing the multiple heat source-type preheating device for a machining apparatus according to the embodiment of the present invention when viewed from above.

As shown in these drawings, the multiple heat source-type preheating device for a machining apparatus according to the embodiment of the present invention basically includes a first heat source provision module 100 and a second heat source provision module 200. The multiple heat source-type preheating device for a machining apparatus performs preheating by sequentially providing two heat sources, provided by the two heat source provision modules 100 and 200, to a portion 11 to be machined, thereby enabling preheating temperature to be maintained for a longer period of time. Accordingly, the multiple heat source-type preheating device for a machining apparatus can achieve more desirable preheating performance than the conventional technologies that use only a single laser beam as a heat source.

The individual components of the multiple heat source-type preheating device for a machining apparatus are described in greater detail below.

First, the first heat source provision module 100 is a module that is provided to preheat the portion 11 of a material 10 to be machined.

The first heat source provision module 100 is installed to be moved along the portion 11 of the material 10 to be machined along with a spindle 20 adapted to rotate a tool 21 at high speed, and is configured to preheat the portion 11 of the material 10 to be machined by providing a heat source thereto.

In particular, the first heat source provision module 100 is installed to be rotated around the tool 21 in the state of being spaced apart from the tool 21.

In other words, the first heat source provision module 100 is installed to be additionally moved in a direction perpendicular to the direction in which the first heat source provision module 100 is rotated around the tool 21.

Accordingly, even when the direction of movement of the tool 21 is rapidly or gradually changed, the first heat source provision module 100 can preheat the portion 11 to be machined, which is located in the direction of the movement.

Meanwhile, a structure configured to enable the first heat source provision module 100 to be rotated around the tool 21 may be implemented in various forms.

In the embodiment of the present invention, a ring-type first guide 310 is rotatably disposed around the spindle 20, and the first heat source provision module 100 is fastened to the first guide 310 by a connection bracket 110, a coupling block 120, and a side bracket 130. In this case, the connection bracket 110 couples the first guide 310 and the coupling block 120 to each other, and the side bracket 130 couples the first heat source provision module 100 to the coupling block 120.

Furthermore, the first guide 310 is configured to receive driving force from a first stepping motor 320 via a timing belt 311 and to be rotated using the driving force.

In particular, the first heat source provision module 100 is disposed on the side bracket 130 to be tilted in a vertical direction, and is disposed to change its location along with the side bracket 130 in the radial direction of the spindle 20, thereby enabling the control of the focus of a laser heat source. In this case, the tilting from the side bracket 130 may be performed by the operation of a tilting motor 150 provided in the first heat source provision module 100, and the location change of the side bracket 130 may be performed by changing the location where the coupling block 120 to which the side bracket 130 has been coupled is coupled to the connection bracket 110 (see the coupling structure of FIG. 2).

Meanwhile, the reference symbol "140" denotes a temperature sensor that is provided to measure the temperature of a portion to be preheated.

Next, the second heat source provision module 200 is a module that is provided to preheat the portion of the material 10 to be machined separately from the first heat source provision module 100.

The second heat source provision module 200 is installed to be moved along with the first heat source provision module 100, and is configured to preheat the portion 11 of the material 10 to be machined by providing a heat source thereto while preceding or following the first heat source provision module.

In particular, the second heat source provision module 200 is installed to be rotated around the first heat source provision module 100 in the state of being spaced from the first heat source provision module 100.

In other words, the second heat source provision module 200 is installed to be additionally moved a direction perpendicular to the direction in which the second heat source provision module 200 is rotated around the first heat source provision module 100. Accordingly, even when the direction of movement of the tool 21 is rapidly or gradually changed, the second heat source provision module 200 can preheat the portion 11 to be machined, which is located in the direction of movement, before or after the first heat source provision module 100.

Meanwhile, a structure configured to enable the second heat source provision module 200 to be rotated around the first heat source provision module 100 may be implemented in various forms.

In the embodiment of the present invention, a ring-type second guide 330 is fixedly installed around the side bracket 130 to which the first heat source provision module 100 is coupled, the second heat source provision module 200 is installed on the second guide 330, and the second heat source provision module 200 is configured to be moved along the second guide 330 by a second stepping motor 340. In this case, the second guide 330 has a rack structure in which a gear 331 is formed along the circumferential surface of the second guide 330. The second stepping motor 340 is fastened to the second heat source provision module 200, and is configured to drive the pinion 341 engaging with the gear 331 of the second guide 330.

Meanwhile, in the embodiment of the present invention, the heat sources provided by the first heat source provision modules 100 and the second heat source provision module 200 are different in preheating area and preheating depth.

In other words, the two heat source provision modules 100 and 200 provide heat sources having different preheating areas and different preheating depths, thereby enabling a preheating area and a preheating depth to be controlled based on the properties of the material 10.

In particular, in the embodiment of the present invention, the first heat source provision module 100 may be implemented as a laser module configured to radiate a laser beam as a heat source, and the second heat source provision module 200 may be implemented as an induction heater configured to provide an electromagnetically induced current and preheat the portion of the material 10 to be machined through induction heating.

Since the preheating depth of the laser beam provided by the laser module is greater than the preheating depth provided by the induction heater and the preheating area of the induction heating provided by the induction heater is larger than the preheating area of the laser beam, the combination of the heat sources based on a laser and induction heating enables universal use for the machining of various materials.

It will be apparent that the two heat source provision modules 100 and 200 may be configured to be all implemented as laser modules or induction heaters and to have different preheating depths and preheating areas.

However, the laser module increases costs and requires a large installation space because the aperture and output of the laser module must be increased in order to radiate a laser beam over a range that can cover the machining range of the tool 21 at one time. In contrast, the induction heater is problematic in that the tool 21 may be damaged during deep machining because the preheating depth range thereof is not sufficient.

In view of this, it is most preferable that the above-described two heat source provision modules 100 and 200 use the combination of the laser beam and the induction heating-based heat source having different preheating depths and different preheating ranges at the same time.

Furthermore, the operations and location changes of the first heat source provision module 100 and the second heat source provision module 200 are performed under the control of a control unit (not shown).

In particular, the control unit is programmed to perform control so that the preheating sequence of the heat sources provided by the two heat source provision modules 100 and 200 varies depending on machining depth or the thermal conductivity of the material 10.

The operation of the multiple heat source-type preheating device for a machining apparatus according to the embodiment of the present invention is described in greater detail below.

First, the control unit receives information about a machining depth, a machining speed and a machining path for the material 10 from a machining apparatus, and determines whether to use any one or both of the first and second heat source provision modules 100 and 200 and the preheating sequence of the two heat source provision modules 100 and 200 based on the received information.

For example, whether to use any one or both of first and second heat source provision modules 100 and 200 is determined based on the properties of the material 10 to be machined. If both of the two heat source provision modules 100 and 200 are to be used, the preheating sequence of the heat source provision modules 100 and 200 is determined.

In the embodiment of the present invention, a case where both of the two heat source provision modules 100 and 200 are used and the second heat source provision module 200 configured to perform preheating through induction heating by providing an electromagnetically induced current preheats the portion of the material 10 to be machined before the first heat source provision module 100 configured to provide a laser beam as a heat source is used as an example.

Furthermore, after the above-described settings have been made, the control unit sequentially locates the two heat source provision modules 100 and 200 according to the set preheating sequence while moving the first heat source provision module 100 and the second heat source provision module 200 by controlling the first stepping motor 320 and the second stepping motor 340 based on previously received information about a machining speed and a machining path.

Thereafter, after the spindle 20 has been driven based on the operation control of the machining apparatus, the control unit allows the heat sources, provided by the respective heat source provision modules 100 and 200, to preheat the portion to be machined by controlling the operations of the first heat source provision module 100 and the second heat source provision module 200.

In other words, the portion 11 of the material 10 to be machined is preheated through the induction heating based on the operation of the second heat source provision module 200, and the portion 11 of the material 10 to be machined is re-preheated using the laser heat source based on the operation of the following first heat source provision module 100.

In particular, although the preheating range (preheating width) of the laser heat source radiated from the first heat source provision module 100 is not wider than the machining width of the tool 21, a portion wider than the diameter of the tool 21 is primarily preheated through the induction heating of the second heat source provision module 200 configured to previously preheat the corresponding portion 11 to be machined.

Accordingly, a case where the laser heat source having a greater preheating depth is radiated onto the primarily preheated portion even within a narrower range can maintain preheating temperature for a longer period of time than the case of providing a single heat source. As a result, the machining of the tool 21 following the preheating of the first heat source provision module 100 can be smoothly performed.

Accordingly, the multiple heat source-type preheating device for a machining apparatus according to the present invention can maintain preheating temperature for a longer period of time than the case of performing preheating by using a single heat source because the multiple heat source-type preheating device for a machining apparatus preheats a portion to be machined by sequentially providing two or more heat sources. As a result, machining can be smoothly performed without causing damage to the portion 11 to be machined or damage to the tool 21 attributable to the rapid cooling of the material 10.

Additionally, the heat sources provided by the two heat source provision modules 100 and 200 are configured to have different preheating depths and different preheating ranges, and thus the multiple heat source-type preheating device for a machining apparatus according to the present invention can perform smooth preheating and machining regardless of the area and depth of a portion to be machined.

In particular, the multiple heat source-type preheating device for a machining apparatus according to the present invention enables the control of the preheating sequence of two or more heat sources and the selective operation control of the two or more heat sources, and thus may be universally used regardless of the type of material 10.

Furthermore, the locations of the two heat source provision modules 100 and 200 can be changed during machining in real time by the operation control of the control unit, and thus the multiple heat source-type preheating device for a machining apparatus according to the present invention can always perform accurate preheating regardless of a machining path or the shape of the portion 11 to be machined.

Meanwhile, the two heat source provision modules 100 and 200 constituting the multiple heat source-type preheating device for a machining apparatus according to the present invention are not limited to a structure in which the two heat source provision modules 100 and 200 are installed to be moved only in the directions in which they are rotated.

In other words, although not shown in the drawings, the two heat source provision modules 100 and 200 may be configured to be moved toward a portion to be preheated in a vertical direction and the control of preheating depth may be additionally performed.

As described above, the multiple heat source-type preheating device for a machining apparatus according to the present invention is a useful invention that may be modified in various forms.

Accordingly, the multiple heat source-type preheating device for a machining apparatus according to the present invention preheats a portion to be machined by sequentially providing two or more heat sources thereto, and thus can maintain preheating temperature for a longer period of time than the case of performing preheating by using a single heat source, thereby providing the effect of performing smooth machining without causing a damage to the portion to be machined or damage to a tool attributable to the rapid cooling of a material.

Furthermore, the heat sources provided by the two heat source provision modules are configured to have different preheating depths and different preheating ranges, and thus the multiple heat source-type preheating device for a machining apparatus according to the present invention provides the effect of enabling smooth preheating and machining regardless of the area or depth of a portion to be machined.

In particular, the multiple heat source-type preheating device for a machining apparatus according to the present invention enables the control of the preheating sequence of the two or more heat sources and the selective operation control of the two or more heat sources, and thus the multiple heat source-type preheating device for a machining apparatus provides the effect of being universally used regardless of the type of material.

Moreover, the locations of the two heat source provision modules can be changed in real time during machining by the operation control of the control unit, and thus the multiple heat source-type preheating device for a machining apparatus according to the present invention provides the effect of always performing accurate preheating regardless of a machining path or the shape of a portion to be machined.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A multiple heat source-type preheating device for a machining apparatus, comprising:
    a first heat source provision module installed to be moved along a portion of a material to be machined along with a spindle adapted to rotate a tool at a speed, and configured to preheat the portion of the material to be machined by providing a heat source thereto while being rotated around the tool in a state of being spaced apart from the tool; and
    a second heat source provision module installed to be moved along with the first heat source provision module, and configured to preheat the portion of the material to be machined by providing a heat source thereto while being rotated around the first heat source provision module in a state of being spaced apart from the first heat source provision module so as to precede or follow the first heat source provision module,
    wherein the heat sources provided by the first heat source provision module and the second heat source provision module have different preheating areas and depths.

2. The multiple heat source-type preheating device of claim 1, wherein a preheating sequence of the heat source provided by the first heat source provision module and the heat source provided by the second heat source provision module is determined based on a machining depth or thermal conductivity of the material.

3. The multiple heat source-type preheating device of claim 1, wherein at least any one of the first heat source provision module and the second heat source provision module is a laser module configured to radiate a laser beam as a heat source.

4. The multiple heat source-type preheating device of claim 1, wherein at least any one of the first heat source provision module and the second heat source provision module is an induction heater configured to preheat the portion of the material to be machined through induction heating by providing an electromagnetically induced current thereto.

* * * * *